US009802163B2

United States Patent
Jassby et al.

(10) Patent No.: US 9,802,163 B2
(45) Date of Patent: Oct. 31, 2017

(54) ELECTRICALLY CONDUCTING REVERSE OSMOSIS MEMBRANES

(71) Applicant: The Regents of the University of California, Oakland, CA (US)

(72) Inventors: David Jassby, Riverside, CA (US); Mark Wiesner, Raleigh, NC (US); Charles-Francois de Lannnoy, Hamilton (CA)

(73) Assignees: The Regents of the University of California, Oakland, CA (US); Duke University, Durham, NC (US)

( * ) Notice: Subject to any disclaimer, the term of this patent is extended or adjusted under 35 U.S.C. 154(b) by 0 days.

(21) Appl. No.: 14/621,795

(22) Filed: Feb. 13, 2015

(65) Prior Publication Data

US 2015/0224450 A1    Aug. 13, 2015

Related U.S. Application Data

(60) Provisional application No. 61/939,613, filed on Feb. 13, 2014.

(51) Int. Cl.
| | | |
|---|---|---|
| C02F 1/44 | (2006.01) | |
| B01D 61/02 | (2006.01) | |
| B01D 69/02 | (2006.01) | |
| B01D 69/12 | (2006.01) | |
| B01D 65/08 | (2006.01) | |
| B01D 71/02 | (2006.01) | |
| B01D 67/00 | (2006.01) | |
| B01D 69/14 | (2006.01) | |
| B01D 71/56 | (2006.01) | |

(52) U.S. Cl.
CPC ........... *B01D 71/021* (2013.01); *B01D 65/08* (2013.01); *B01D 67/0079* (2013.01); *B01D 69/02* (2013.01); *B01D 69/148* (2013.01); *B01D 71/56* (2013.01); *C02F 1/441* (2013.01); *B01D 61/025* (2013.01); *B01D 2325/26* (2013.01); *C02F 2303/20* (2013.01)

(58) Field of Classification Search
CPC .... B01D 65/08; B01D 67/0079; B01D 69/02; B01D 69/148; B01D 71/56; B01D 71/021; C02F 1/441
See application file for complete search history.

(56) References Cited

U.S. PATENT DOCUMENTS

| | | | | |
|---|---|---|---|---|
| 2006/0115640 | A1* | 6/2006 | Yodh | B82Y 10/00 428/221 |
| 2011/0080006 | A1* | 4/2011 | Blau | F03G 7/00 290/1 R |
| 2012/0058255 | A1* | 3/2012 | Gan | C08L 33/12 427/113 |
| 2013/0284086 | A1* | 10/2013 | Strauss | B82B 3/0014 118/621 |

FOREIGN PATENT DOCUMENTS

| | | | | |
|---|---|---|---|---|
| WO | WO 2013170249 A1 * | 11/2013 | | B01D 69/10 |

OTHER PUBLICATIONS (Fang NPL—Interfacially polymerized composite HFM.pdf)—"Interfacially polymerized composite nanofiltration . . . "—Journal of Membrane Science—Dec. 20, 2012—Wangxi Fang et al.*

* cited by examiner

*Primary Examiner* — Krishnan S Menon
*Assistant Examiner* — Bradley R Spies
(74) *Attorney, Agent, or Firm* — Gavilovich, Dodd & Lindsey LLP

(57) ABSTRACT

The disclosure provides composite membranes for use in water purification and filtration.

10 Claims, 5 Drawing Sheets

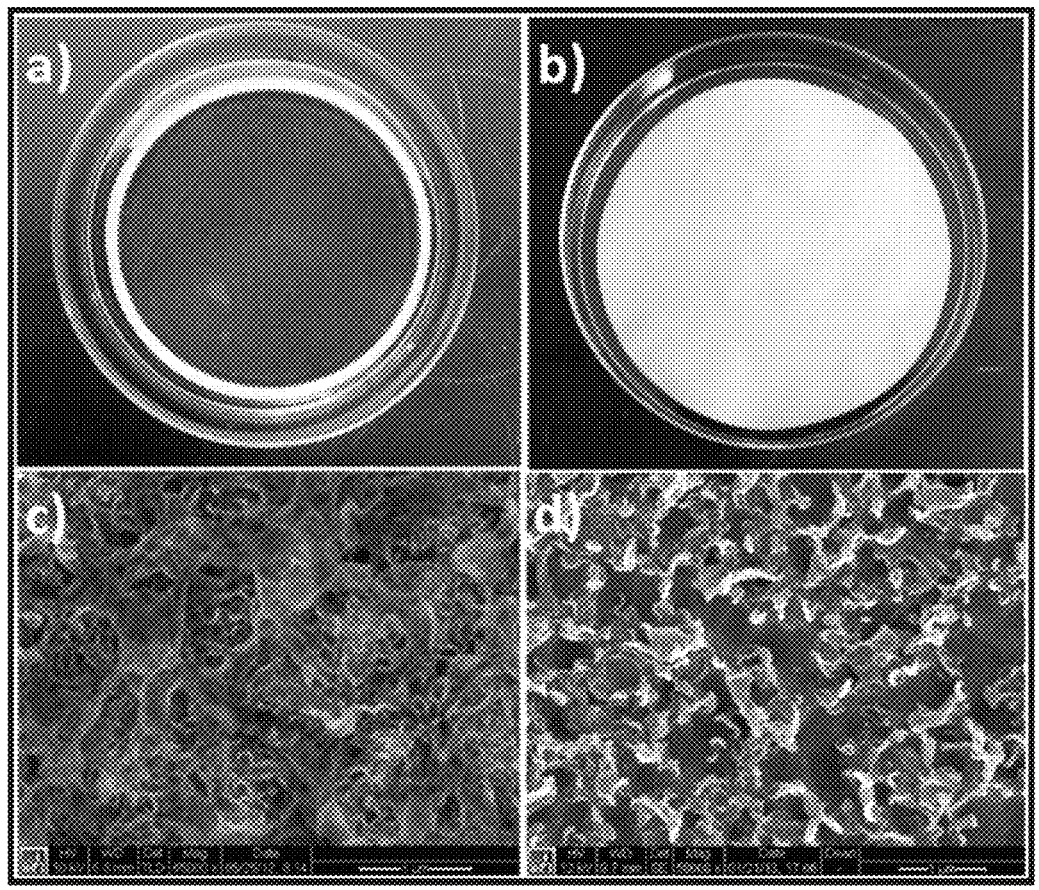
FIGURE 2A-D
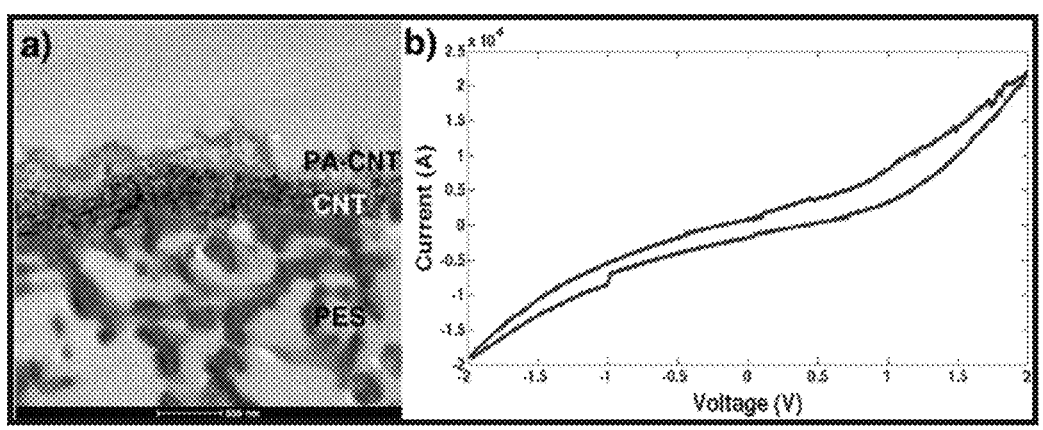
FIGURE 3A-B

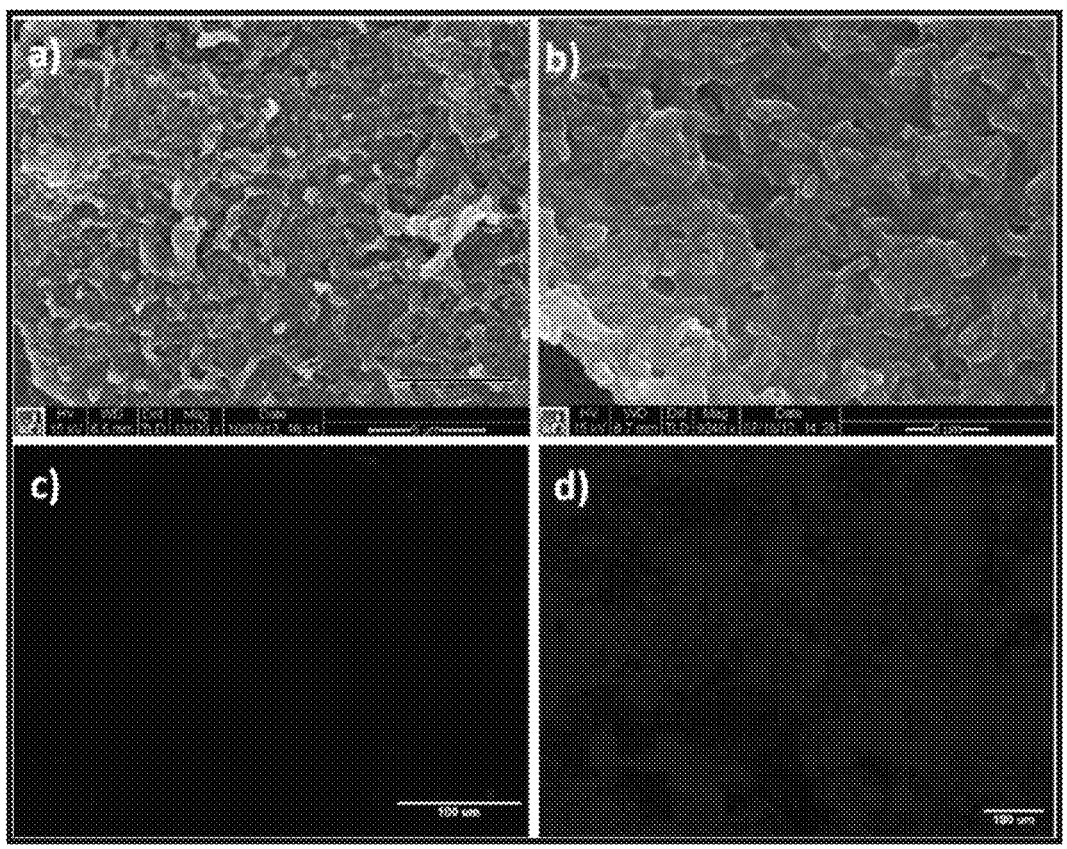
FIGURE 6A-D
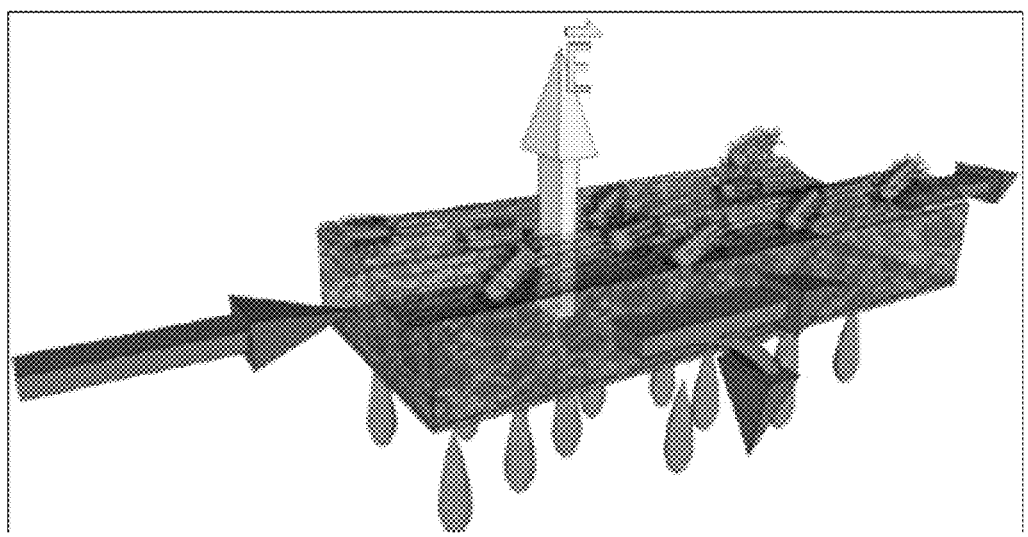
FIGURE 7

ELECTRICALLY CONDUCTING REVERSE OSMOSIS MEMBRANES

CROSS REFERENCE TO RELATED APPLICATIONS

This application claims priority to U.S. Provisional Application No. 61/939,613, filed Feb. 13, 2014, the disclosure of which is incorporated herein by reference in its entirety.

STATEMENT REGARDING FEDERALLY SPONSORED RESEARCH

This invention was made with Government support under Grant No. 0830093, awarded by the National Science Foundation. The Government has certain rights in this invention.

BACKGROUND

Biofouling of polymer surfaces is a ubiquitous and costly problem. Biofouling occurs when bacteria grow on surfaces known as biofilms, which secrete a thick sticky layer composed of extra-polymeric substances (EPS). 1,2 Biofouling afflicts fields as widespread as medical equipment (prosthetics, IV tubing, and dialysis membranes), commercial and private boating (hulls and propellers), and industrial and municipal liquid treatment (orange juice concentration, protein separation, desalination, and wastewater treatment). The applications most beleaguered by biofilms are membrane-based desalination and wastewater treatment processes. These processes are challenged with conditions that are ideal for the rapid proliferation of bacterial colonies and the establishment of robust biofilms on the membrane surface. The confluence of high pressures concentrating an ideal nutrient balance onto rough organic surfaces contaminated with extremely high bacterial populations represents ideal biofouling conditions.

Biofouling in membrane separation processes necessitates extensive pretreatment that incurs additional costs. Pretreatment includes chemical treatment (e.g., flocculation) and ultrafiltration (UF), which limit process efficiency and increase costs. Polyamide (PA) thin films are currently the state-of the-art material for desalination and wastewater reclamation. A solution to biofouling on PA thin films could revolutionize the entire reverse osmosis (RO) process train by reducing costs associated with pretreatment, energy for high recoveries, and capital; by reducing the plant foot print through minimized pretreatment; and by increasing membrane lifetime through reduced chemical use and biofouling suppression.

SUMMARY

The disclosure provides an electrically conductive composite membrane comprising functionalized carbon nanotubes (CNTs) in a polyamide matrix, wherein the CNTs form ester bonds with trimesoyl choloride and wherein the membrance has electric conductivity of about 400 S/m.

The disclosure also provides an electrically conductive composite membrane formed by: (a) placing functionalized carbon nanotubes (CNTs) in powder form in deionized water at a concentration of about 0.1 mg/ml together with a surfactant at about 1 mg/ml and sonicating suspension to form a solution; (b) centrifuging the solution for 10 minutes at about 11,000 RCF, and discarding the pellet; (c) pressure depositing the solution at a pressure of 50 psi of greater on a support; (d) soaking the deposited CNTs in an aqueous solution of m-phenylene diamine (MPD); (e) slightly drying the support; (f) placing the support in a 0.15% trimesoly chloride solution in hexane for about 1 minute to form a composite; and (g) drying the composite in an oven at 90° C. for about 15 minutes. In one embodiment, the functionalized carbon nanotubes are functionalized with COOH, OH, or NH2 functional groups. In another embodiment, the surfactant is sodium dodecylbenzenefulfonate. In another embodiment, the carbon nanotubes are single-walled, multi-walled, or double-walled carbon nanotubes. In yet another embodiment, the support comprises a polyethersulfone or polysulfone.

The disclosure also provides a method of making an electrically conductive CNT-PA composite membrane comprising (a) placing functionalized carbon nanotubes (CNTs) in powder form in deionized water at a concentration of about 0.1 mg/ml together with a surfactant at about 1 mg/ml and sonicating suspension to form a solution; (b) centrifuging the solution for 10 minutes at about 11,000 RCF, and discarding the pellet; (c) pressure depositing the solution at a pressure of 50 psi of greater on a support; (d) soaking the deposited CNTs in an aqueous solution of m-phenylene diamine (MPD); (e) slightly drying the support; (f) placing the support in a 0.15% trimesoly chloride solution in hexane for about 1 minute to form a composite; and (g) drying the composite in an oven at 90° C. for about 15 minutes. The disclosure also includes a membrane produced by this method.

The disclosure also provides a reverse osmosis system comprising a membrane of the disclosure.

The disclosure not only overcomes difficulties in prior development of reverse osmosis membranes but also provides electrically conductive membranes which reduce contamination and biofouling. The method includes the functionalized carbon nanotubes being pressure deposited with a minimum pressure of 50 psi. Lower pressure results in poor adhesion of the CNT layer, poor electrical conductivity, and ultimately the delamination of the CNT-polyamide composite from the PSF or PES support.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the disclosure and, together with the detailed description, serve to explain the principles and implementations of the invention.

FIG. 2A-D shows (a) ECPNC NF membrane, the black surface shows the CNTs, which have been reacted onto the white PES support, (b) a plain PA membrane, (c) SEM image showing the top surface of the PA-CNT ECPNC thin film morphology, (d) SEM image showing the top surface of the plain PA thin film. While not identical, there are similar noodle-like structures found on both surfaces.

FIG. 3A-B shows TEM image of the ECPNC PA-CNT membrane. Three layers are evident in (a), the PES support, the deposited CNT layer, and the PACNT composite layer.

In (b) cyclic voltammetry data of the electrically conductive ECPNC surface reveals a linear relationship between −0.9 V and 0.9 V.

Figure 4:
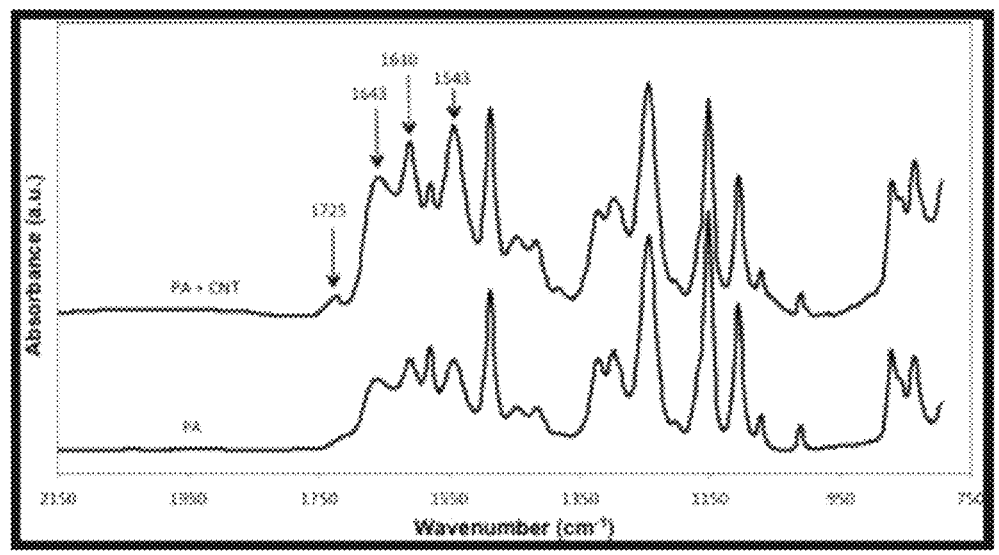

FIG. 4 shows ATR-FTIR spectra of the membranes used in the study. The top curve is the PA+CNT polymer, whereas the bottom curve is the plain PA membrane.

Figure 5:
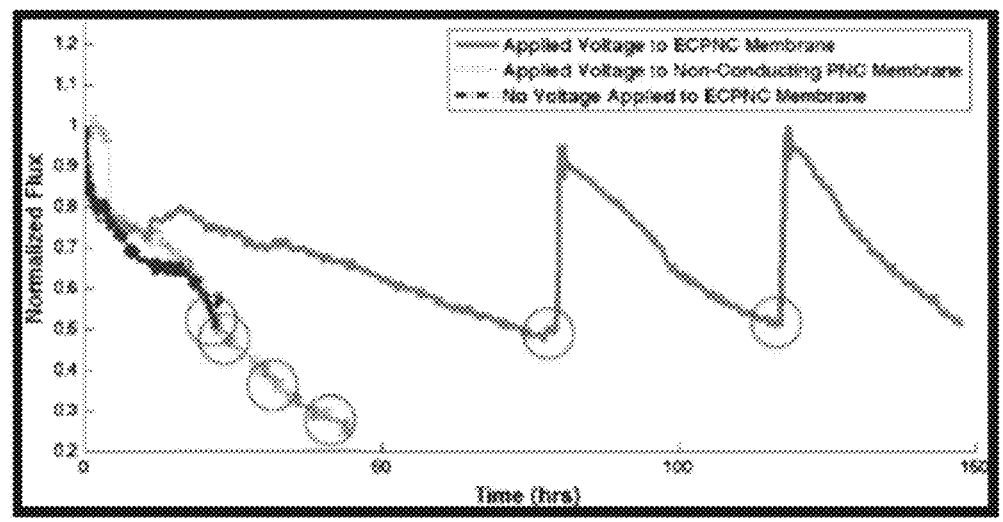

FIG. 5 shows control experiments without applied voltage and with highly resistive membranes with applied voltage suffered from irrecoverable biofouling. ECPNC membranes, with applied voltage, demonstrated much longer resistance to flux decline and flux was completely recoverable with one minute of cross-flow flushing. Red circles represent membrane flushing points.

FIG. 6A-D shows membrane surfaces after desalination of *P. aeruginosa* in LB media (same scale). In (a) the SEM image shows a clean ECPNC surfaces devoid of biofilms after 6 days of continuous desalination of *P. aeruginosa* in LB media. The rough surface is typical of compressed polyamide surfaces. In (b) the SEM image shows the control membrane surface completely fouled with bacteria after 2 days of continuous desalination of *P. aeruginosa* in LB media. EPS layers forming the biofilm are evident showing smooth interconnections between bacteria. In (c) DAPI staining of the ECPNC membrane surfaces shows a small amount of bacterial DNA located in thin strips. In (d) DAPI staining of the control membrane indicates large amounts of bacterial DNA throughout the membrane surface.

FIG. 7 shows a diagram showing how a membrane of the disclosure would work in a water purification system.

FIG. 8 shows the condensation reaction between TMC, MPD, and Hydroxyl Group on CNT Sidewall leading to the incorporation of the CNTs into the membrane matrix.

DETAILED DESCRIPTION

As used herein and in the appended claims, the singular forms "a," "and," and "the" include plural referents unless the context clearly dictates otherwise. Thus, for example, reference to "a membrane" includes a plurality of such membranes and reference to "the nanotube" includes reference to one or more nanotubes and equivalents thereof, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

Carbon nanotubes are promising materials for use in membranes because they have been shown to exhibit remarkably high flux. Molecular simulations and experimental studies have shown that the transport of fluids through carbon nanotubes is orders of magnitude faster than through other nanoporous materials due to the unprecedented smoothness and regularit of the carbon nanotube pores. It has been suggested that the transport of water through sub-nanometer carbon nanotubes occurs by way of a cooperative, pulse-like movement of hydrogen-bonded molecules within the channel, similar to what has been observed in aquaporin biological channels. The transport of water in carbon nanotubes has been shown to give flow rates that are faster than predicted by classical hydrodynamics. The enhanced water transport together with carbon nanotube pore diameters on the order of nanometers opens the possibility of employing carbon nanotubes to filter ions from water. Molecular dynamics (MD) simulation studies have examined the ability of carbon nanotubes with diameters ranging from 0.6 to 1.1 nm to filter ions from water. These results indicated that ions can be almost completely excluded from pores up to 0.9 nm in diameter due to ion desolvation energy barriers. By contrast, water faces relatively low energy barriers and is able to pass through these small nanotubes, but at flow rates that are much lower than in larger nanotubes because water transport in these narrow carbon nanotubes is limited to single-file flow. Larger diameter carbon nanotubes have much higher water flux, but do not have the ability to reject ions. The larger diameter nanotubes did not exhibit any ion rejection properties, but did display gated transport due to water wettability, that could be tuned by temperature, sonication, or addition of solutes. Carbon nanotubes with pore diameters down to 0.4 nm have been reported so that it is at least in principle possible to produce nanotubes that would reject ions by size exclusion. However, experimentally produced carbon nanotubes have a range of diameters and it is currently not possible to economically separate out nanotubes having a very narrow diameter distribution, so that producing membranes with carbon nanotubes having diameters<0.9 nm is not currently practical. An alternate approach to requiring very small diameter carbon nanotubes is to tune the effective diameter of the carbon nanotube entrance by attaching functional groups. For example, biotin functionalized carbon nanotubes and voltage gated nanotube membranes formed by tethering charged molecules to the ends of large-diameter carbon nanotubes have been produced. Their work has focused on studying transport of two different sized but equally charged molecules, ruthenium bipyridine and methyl viologen, through multi-walled carbon nanotubes with 7-nm nominal core diameters. They showed that flux and selectivity could be changed by applying a voltage across the membrane and that this result is consistent with the charged functional groups being drawn into the carbon nanotubes at positive bias, causing a modulation of the pore size (Majumbder et al 2007), Similarly, tip and core functionalization of large diameter carbon nanotubes has been shown to modulate the flux of water, both experimentally (Majumbder, 2011) and from simulations. Atomistic simulations by Corry predicted that ion rejection can take place in carbon nanotubes having 1.1 nm diameters through the addition of functional groups having charged moieties. See Corry, B., Energy Environ, ScL, 4, 751-759 (2011). In the foregoing methods, the flow of liquid is perpendicular to the membrane. In contrast in reverse osmosis systems the flow of fluid is substantially parallel to the membrane, although pressure is substantially perpendicular.

Eliminating biofouling on polymeric thin films or membranes would ease the environmental impact of reverse osmosis (RO) by lessening carbon emissions and minimizing chemical waste. The development of novel strategies to overcome biofouling on membranes is a long-active area in membrane research. It has been suggested that small, applied electrical potentials on electrically conductive surfaces can prevent the growth and proliferation of biofilms. It has been further hypothesized that applying a positive bias creates an oxidizing environment for the bacteria, which increases bacterial surface mobility and prevents bacteria from attaching. A negative bias creates are pulsive electrostatic force between the similarly charged bacteria and the surface. Applying an alternating electrical potential to a surface efficiently prevents bacteria from forming a biofilm. Thus, an electrically conducting membrane has the potential of solving the biofouling challenge.

The application of this technique to RO and nanofiltration (NF) membrane systems is hindered by the inherent insulating nature of polymers used as membranes. Over the years, attempts have been made to use electrically conducting polymers to form water treatment membranes. However, traditional conducting polymers, such as polypyrrole, are notoriously difficult to process, and membranes made from these materials suffer from low selectivity, low flux, and often, low conductivity.

Electrically conducting carbon nanotubes (CNTs), deposited on a support layer in a dead-end configuration, are capable of bacterial inactivation once an electric bias is applied. However, RO and NF membrane processes rely on a cross-flow, where feedwater flows in parallel to the membrane surface. Nanomaterials that are simply deposited on a membrane surface will quickly wash away in the flow. There are currently no electrically conductive RO or NF membranes, let alone the application of these membranes to the successful prevention of biofilm formation.

As used herein, the term "liquid" refers to any liquid that has the particles loose and can freely form a distinct surface at the boundaries of its bulk material. Examples of liquid include, but are not limited to, water, industrial streams, chemicals, or bodily liquids. Examples of water include, without limitation, salted water, sea water, well water, underground water, and waste water. Examples of industrial stream include, without limitation, pharmaceutical industry process stream, or food industry process stream. Examples of chemicals include, without limitation, chemicals used in pharmaceutical industry, laboratories, or research organizations. Examples of bodily liquids include, without limitation, diluted, untreated, or treated body fluids such as milk, blood, plasma, urine, amniotic liquid, sweat, saliva, etc.

As used herein, the term "membrane" intends a porous material whose lateral dimension is significantly larger than the dimensions across it.

As used herein the term "nanotube" intends a substantially cylindrical tubular structure of which the most inner diameter size is an average of less than about 6 nm. Nanotubes are typically, but not exclusively, carbon molecules and have novel properties that make them potentially useful in a wide variety of applications in nanotechnology, electronics, optics, and other fields of materials science. They exhibit extraordinary strength and unique electrical properties, and are efficient conductors of heat. The nanotube is a member of the fullerene structural family, which also includes buckyballs. Where buckyballs are spherical in shape, a nanotube is cylindrical, with at least one end typically capped with a hemisphere of the buckyball structure. The name is derived from their size, since the diameter of a nanotube can be on the order of a few nanometers (approximately 50,000 times smaller than the width of a human hair), while they can be up to several millimeters in length. The nanotubes can be single-walled nanotubes (SWNTs), double-walled nanotubes (DWNTs) and multi-walled nanotubes (MWNTs). Nanotubes may be composed primarily or entirely of $sp^2$ bonds, similar to those of graphite. This bonding structure, stronger than the $sp^3$ bonds found in diamond, provides the molecules with their unique strength. Nanotubes naturally align themselves into "ropes" held together by Van der Waals forces. Under high pressure, nanotubes can merge together, trading some $sp^2$ bonds for $sp^3$ bonds, giving great possibility for producing strong, unlimited-length wires through high-pressure nanotube linking Nanotubes are comprised of various materials, which include, but are not limited to, carbon, silicon, silica and selenium. Inorganic nanotubes such as boron nitride have also been synthesized. Carbon nanotubes include single wall, double wall, and multiwall types. A "single-wall" is one tubular layer, straight or tortuous, of carbon atoms with or without a cap at the ends, while a "double-wall" is two concentric tubular layers, straight or tortuous, of carbon atoms with or without a cap at the ends and a "multi-wall" intends more than two concentric tubular layers, straight or tortuous, of carbon atoms with or without a cap at the ends.

As used herein, the terms "functional," or "functionalized," or "functionalization," refer to any group that imparts selectivity or modifies charge transfer capacity to the carbon nanotubes. The functional groups include, without limitation, charged groups, non-charged groups, or permanent charged groups.

Charged groups at the ends of carbon nanotubes, which generate electric fields, will also perturb the flux of water (Joseph et al., Nano Lett., 3, 1399-1403 (2003)). Simulation studies on (10,10) boron nitride nanotubes versus (10,10) carbon nanotubes show reversed selectivity of $K^+$ and $OH^-$ ions due to different entrance effects that result from the difference in charges at the entrance of the nanotubes. See Won et al., Chem. Phys. Lett., 478, 185-190 (2009).

In some embodiments, the nanotube is functionalized with an acidic group or a basic group. In some embodiments, the nanotube is functionalized with a charged group. In some embodiments, the nanotube is functionalized with a group selected from carboxylic acid, sulfonic acid, phosphonic acid, amine, amide, polymer, dendrimer, and a polyelectrolyte. In some embodiments, the nanotube is functionalized with an amide or polyamide. In some embodiments, the nanotube is functionalized with a short oligomer or a long oligomer of, for example, polyethylene glycol (PEG) polymer. In some embodiments, the nanotube is functionalized with polyelectrolytes. In some embodiments, the nanotube is functionalized with a dendrimer. Example of dendrimer includes, without limitation, poly(amidoamine) (PAMAM).

It should be understood that the nanotubes are functionalized with from about 5%-100% of the site available for functionalization; from about 10%-90%; from about 25%-75%; from about 50%-75%; or from about 50%-100%. In some embodiments, functionalization of the nanotubes with just one functional group is sufficient to impart properties to the membrane. In some embodiments, all the available sites on the nanotubes are functionalized to impart properties to the nanotubes.

It is noted that nanoporous graphene is a system that is similar to carbon nanotubes; both are one-atom thick materials composed of carbon. Atomistic simulations have been used to predict that porous graphene could also be used for desalination by tuning the size of the pores. See Sint et al., Journal of the American Chemical Society, 130, 16448-16449 (2008).

Carbon nanotubes functionalized with chain-like zwitterion groups have great promise in being more effective at rejecting both positive and negative ions than carbon nanotubes having singly charged functional groups. It is believed that this enhanced performance is due to a combination of Donnan-type rejection and steric hindrance, because the zwitterion groups are larger and have more conformational degrees of freedom than the functional groups considered in previous simulations (Corry, 2011). Zwitterionic groups can be used to prevent biofouling, which is a major problem with current desalination membranes, since zwitterion-treated surfaces have been shown to be resistant to both cell adhesion and biofouling.

The disclosure shows the prevention of long-term biofilm growth achieved using an electrically conductive polymer nanocomposite (ECPNC) membrane. This is made possible with the development of polymer nanocomposite membranes and a modification of the traditional cross-flow system that, taken together, eliminates the need for aquatic bacterial disinfection. The disclosure provides a modification of thin film composites through crosslinking with functionalized (e.g., carboxylated) carbon nanotubes that imbues these thin films with electrical conductivity orders of magnitude greater than the base polymer while maintaining the requisite flux and salt rejection characteristics of traditional membranes. In long-term filtration of bacterially contaminated waters, these membranes were able to prevent the growth of biofilms when an electrical potential was applied across their surface.

The disclosure demonstrates that electrically conductive polymer-nanocomposite membrane-containing carbon nanotubes are highly resistant to biofilm formation when an electrical potential is applied across the membrane. In embodiments of the disclosure, zwitterion-functionalized nanotubes can also function in a similar way, but without the need for the imposed electrical potential, because the groups have permanent charges.

The disclosure provides carbon nanotube/porous membrane composites. In one embodiment, functionalized carbon nanotubes are embedded in or coated on a porous membrane. The carbon nanotubes can be functionalized in a number of ways. Typically the carbon nanotubes are functionalized with COOH, OH, $NH_2$ and/or other charged functionalizing groups. These functionalized carbon nanotubes are dispersed in a suitable surfactant, washed and then deposited into or onto a porous membrane or porous membrane precursor material. The nanotube-membrane composite material is then dried, washed, or otherwise prepared for use. The final preparation will depend upon the membrane material and the functionalization of the carbon nanotubes. For example, where the membrane is an amine based membrane, a multivalent amine buffer can be used. Examples of multivalent amine compounds and diamine compounds containing an aromatic ring include monocyclic aromatic diamine compounds such as m-phenylene diamine, p-phenylene diamine, and 3,5-diaminobenzoic acid; naphthalene or polycyclic aromatic diamine compounds such as 1,5-naphthalene diamine, 2,6-naphthalene diamine, 9,10-anthracene diamine, and 2,7-diaminofluorene; bis(diaminophenyl) compounds or various derivatives thereof such as 4,4'-diaminobenzanilide, 3,4'-diaminodiphenyl ether, 4,4'-diaminodiphenyl ether, 3-carboxy-4,4'-diaminodiphenyl ether, 3-sulfonic acid-4,4'-diaminodiphenyl ether, 3,4'-diaminodiphenyl methane, 4,4'-diaminodiphenyl methane, 3,4'-diaminodiphenyl sulfone, 4,4'-diaminodiphenyl sulfone, 3,4'-diaminodiphenyl sulfide, 4,4'-diaminodiphenyl sulfide, 4-aminobenzoic acid 4-aminophenyl ester, and 9,9-bis(4-aminophenyl) fluorene; 4,4'-diaminobiphenyl or various derivatives thereof such as 4,4'-diaminobiphenyl, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl-4,4'-diaminobiphenyl, and 2,2'-di(trifluoro methyl)-4,4'-diaminobiphenyl; bis(aminophenoxy) compounds such as bis(4-aminophenoxy phenyl) sulfone, bis(3-aminophenoxy phenyl) sulfone, bis(4-aminophenoxy) biphenyl, bis[4-(4-aminophenoxyl)phenyl]ether, 2,2-bis[4-(4-aminophenoxyl)phenyl]propane, 2,2-bis[4-(4-aminophenoxyl)phenyl] hexafluoropropane, 1,4-bis(4-aminophenoxy)benzene, 1,3-bis(3-aminophenoxy)benzene, and 1,3-bis(4-aminophenoxy)benzene; bis(3-amino-4-hydroxyphenyl) compounds such as bis(3-amino-4-hydroxyphenyl) hexafluoropropane, bis(3-amino-4-hydroxyphenyl) sulfone, bis(3-amino-4-hydroxyphenyl) propane, bis(3-amino-4-hydroxyphenyl)methylene, bis(3-amino-4-hydroxyphenyl) ether, bis(3-amino-4-hydroxy) biphenyl, and 9,9-bis(3-amino-4-hydroxyphenyl) fluorene; bis(aminobenzoyl) compounds such as 2,2'-bis[N-(3-aminobenzoyl)-3-amino-4-hydroxyphenyl]hexafluoropro-pane, 2,2'-bis[N-(4-aminobenzoyl)-3-amino-4-hydroxyphenyl] hexafluoropropane, 2,2'-bis[N-(3-aminobenzoyl)-3-amino-4-hydroxyphenyl]propane, 2,2'-bis[N-(4-aminobenzoyl)-3-amino-4-hydroxyphenyl]propane, bis[N-(3-aminobenzoyl)-3-amino-4-hydroxyphenyl]sulfone, bis[N-(4-aminobenzoyl)-3-amino-4-hydroxyphenyl]sulfone, 9,9-bis[N-(3-aminobenzoyl)-3-amino-4-hydroxyphenyl]fluorene, 9,9-bis[N-(4-aminobenzoyl)-3-amino-4-hydroxyphenyl] fluorene, N,N'-bis(3-aminobenzoyl)-2,5-diamino-1,4-dihydroxy benzene, N,N'-bis(4-aminobenzoyl)-2,5-diamino-1,4-dihydroxy benzene, N,N'-bis(3-aminobenzoyl)-4,4'-diamino-3,3-dihydroxy biphenyl, N,N'-bis(4-aminobenzoyl)-4,4'-diamino-3,3-dihydroxy biphenyl, N,N'-bis(3-aminobenzoyl)-3,3'-diamino-4,4-dihydroxy biphenyl, and N,N'-bis(4-aminobenzoyl)-3,3'-diamino-4,4-dihydroxy biphenyl; heterocyclic containing diamine compounds such as 2-(4-aminophenyl)-5-aminobenzoxazole, 2-(3-aminophenyl)-5-aminobenzoxazole, 2-(4-aminophenyl)-6-aminobenzoxazole, 2-(3-aminophenyl)-6-aminobenzoxazole, 1,4-bis (5-amino-2-benzoxazolyl)benzene, 1,4-bis(6-amino-2-benzoxazolyl)benzene, 1,3-bis(5-amino-2-benzoxazolyl) benzene, 1,3-bis(6-amino-2-benzoxazolyl)benzene, 2,6-bis (4-aminophenyl)benzobisoxazole, 2,6-bis(3-aminophenyl) benzobisoxazole, 2,2'-bis[(3-aminophenyl)-5-benzoxazolyl] hexafluoropropane, 2,2'-bis[(4-aminophenyl)-5-benzoxazolyl]hexafluoropropane, bis[(3-aminophenyl)-5-benzoxazolyl], bis[(4-aminophenyl)-5-benzoxazolyl], bis[(3-aminophenyl)-6-benzoxazolyl], and bis[(4-aminophenyl)-6-benzoxazolyl]; aromatic triamine compounds such as 1,3,5-triamino benzene, tris(3-aminophenyl) methane, tris(4-aminophenyl) methane, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy) benzene, 1,3,5-tris(4-aminophenoxy)triazine, melamine, and 2,4,6-triamino pyrimidine; aromatic tetraamine compounds such as 1,2,4,5-tetraaminobenzene, 3,3',4,4'-tetraaminobiphenyl, 3,3',4,4'-tetraaminodiphenyl sulfone, 3,3', 4,4'-tetraaminodiphenyl sulfide, 2,3,6,7-tetraaminonaphthalene, and 1,2,5,6-tetraaminonaphthalene; and compounds produced from these multivalent amine compounds or diamine compounds by replacing one or more of the hydrogen atoms bonded to their aromatic rings with hydrocarbons or halogen atoms. Examples of aliphatic multivalent amine compounds include aliphatic diamine compounds such as ethylene diamine, propylene diamine, butane diamine, pentane diamine, hexane diamine, octane diamine, nonane diamine, decane diamine, undecane diamine, dodecane diamine, tetramethyl hexane diamine, 1,12-(4,9-dioxa) dodecane diamine, and 1,8-(3,6-dioxa) octane diamine; alicyclic diamine compounds such as cyclohexane diamine, 4,4'-methylene bis(cyclohexyl amine), and isophorone diamine; the polyoxyethylene amine and polyoxypropylene amine products under the trade name of Jeffamine (manufactured by Huntsman Corporation) and copolymer compounds thereof.

Approaches to promote more affinity between nanotubes and the polymer at the interface and provide a uniform dispersion of the nanotubes within the polymer include the use of dispersing agents or modifying the surface chemistry of the nanotubes. Dispersing agents such as surfactants, or nanotube surfaces modified with carboxylic, amide groups, or surface bound polymers have been used to facilitate nanotube incorporation into a polymer.

If a surfactant is used, a variety of CNT: surfactant ratios may be used for dispersion and alignment of the CNTs. In certain embodiments, CNT: surfactant ratios of about 1:5 to about 1:15 are contemplated, although other values outside of this range may also be used. The surfactant may be any surfactant that allows for the desired dispersion of the CNTs. In certain embodiments of the present invention, the surfactant is sodium dodecylsulfonate, sodium dodecylbenzenesulfonate, ammonium lauryl sulfate, sodium laureth sulfate, alkyl benzene sulfonate, or the like.

The porous membrane can be flexible or rigid, and can comprise an organic material, inorganic material, a metal material, or a combination of the foregoing materials. Exemplary organic materials for porous support membranes include cellulose acetates, cellulose nitrates, regenerated celluloses, polysulfones, polyethersulfones, polypiperazine amides (such as FILMTEC sold by Dow Chemical), polyacrylonitriles and copolymers, track-etched polyesters (e.g., those sold under the trade name CYCLOPORE by Whatman Ltd), polycarbonates (e.g., those sold under the trade name NUCLEPORE by Whatman Ltd, poly(vinylidene difluoride),polypropylenes, Nylon 6,6, poly(tetrafluoroethylene)s (e.g., those sold under the trade names PORO-TEX and PARA-TEL by DeWAL Industries), and combinations of the foregoing materials. In one embodiment, the disclosure provides a carbon nanotube/polyamide nanocomposite membrane.

The disclosure provides methods of making such membranes. For example, in certain embodiments, the membranes can be made by: (A) placing functionalized carbon nanotubes (e.g., COOH, OH, or $NH_2$ functionalized nanotubes) in powder form in deionized water at a concentration of about 0.05-0.5 (e.g., 0.1) mg/ml together with a surfactant (e.g., sodium dodecylbenzenesulfonate) at about 1-3 mg/ml (e.g., 1 mg/ml) and sonicating the suspension. (B) The sonicated suspension is then centrifuged to remove clumps and debris. For example, the centrifugation can be for 5-30 (e.g., about 10-25, 15-20 etc.) minutes at about 5-15,0000 RCF (e.g., about 11,000 RCF), and the resulting pellet discarded. One of skill in the are will recognize longer centrifugation at lower RCF can be used or higher RCF with a shorter centrifugation time. In some embodiments, the centrifugation can be carried out 1 or more times (e.g., 2, 3, 4, 5, or more times). (C) An aliquot (e.g., about 50 ml) of the purified CNT suspension is the deposited into or onto a membrane precursor or membrane, respectively. For example, the purified CNT suspension can be pressure deposited into a polymeric membrane material. Useful polymers include, but are not limited to, polystyrene, polypropylene, a polyolefin, a polymethacrylate, polyvinylalcohol, a polyacrylamide, a polycaprolactone, a copolymer of ethylene, a copolymer of propylene, a copolymer of acetate, polyethylene terephthalate), a nylon, a polysulfone (PES), a polyimide, a polyamidimide, a polybenzaimidazole, and combinations thereof. The pressure deposition can be performed in any number of ways, but typically will be at about 50 psi, e.g., 30-70, 40-60, 45-55 psi. For example, in one embodiment, the purified CNT suspension is pressure deposited at about 50 psi on a porous PES or PSF support. (D) The deposited CNTs and the support are soaked in an aqueous solution of m-phenylene diamine (MPD) (e.g., about a 2% aqueous solutions) for about 2 minutes; (e) the soaked support is then slightly dried and placed in a 0.15% trimesoly chloride solution in hexane for about 1 minute; and (f) the material is then dried in an oven at 90° C. for about 15 minutes. The resulting membrane can be stored in water until used. The resulting membrane containing CNTs is conductive and can be used as a conductive, reverse osmosis membrane.

Carbon nanotubes for use in nanocomposite membranes, and for use in membrane fabrication methods of the disclosure may have a pore diameter of about 1 nm to about 100 nm, about 2 nm to about 30 nm, about 5 nm to about 25 nm, about 10 nm to about 20 nm, about 10 nm to about 18 nm, about 10 nm to about 16 nm, about 10 nm to about 14 nm, about 10 nm to about 12 nm, about 12 nm to about 20 nm, about 14 nm to about 24 nm, about 16 nm to about 22 nm, about 12 nm to about 18 nm, about 14 nm to about 16 nm, about 15 nm to about 19 nm, about 11 nm to about 15 nm, and so on.

Further, carbon nanotubes, nanotubes for use in nanocomposite membranes, and for use in membrane fabrication methods of the disclosure may have a length anywhere from about 0.02 µm to about 10 µm, about 0.1 µm to about 2.0 µm, about 0.5 µm to about 1.5 µm, about 0.7 µm to about 1.3 µm, about 0.8 µm to about 1.2 µm, about 0.9 µm to about 1.1 µm, about 0.5 µm to about 1.2 µm, about 0.9 µm to about 1.5 µm, about 0.8 µm to about 1.4 µm, about 0.7 µm to about 1.1 µm, and so on.

The length, diameter, and other properties of the carbon nanotubes may be chosen according to the particular filtering applications desired (e.g., porosity, conductivity etc.) for the nanocomposite membrane. For example, for gas separations, smaller pore diameters which selectively allow specific gas molecules to pass through the nanocomposite membrane while excluding other gas molecules may be used, while for desalination applications, pore sizes which allow Ovate molecules to pass through the nanocomposite membrane while excluding salt ions may be used. Further, the length of the nanotubes may be chosen according to the thickness of the membrane desired.

The methods of the present disclosure may use a variety of types of carbon nanotubes, including multi-wailed carbon nanotubes (MVVNTs), double-walled carbon nanotubes (DWNTs), and single-walled carbon nanotubes (SWNTs). In a preferred embodiment, single-walled nanotubes (SWNTs) are used. The carbon nanotubes may be synthesized through a variety of methods known in the art, including arc discharge, laser ablation, plasma torch, high pressure CO disproportion, and chemical vapor deposition (CVD).

SWNTs for use in methods of the disclosure may be of a variety of dimensions. A non-limiting example of a SWNT for use in composite membranes of the disclosure is a SWNT with an outer diameter of 1.5 nm and a length of 1 μm. Another non-limiting example of a SWNT for use in nanocomposite membranes of the disclosure is a SWNT with a diameter of about 15.6 In other embodiments, SWNTs for use in membrane fabrication have an outer diameter of about 0.5 nm to about 2.0 nm, and a length anywhere from about 0.1 μm to 10 μm, and any range in between.

In various embodiments of methods according to the disclosure, the carbon nanotubes can be functionalized with a variety of functional groups, including but not limited to alkanes, alkenes, alkynes, phenyl groups, alkyl halides, amines, amides, alcohols, ethers, aldehydes, ketones, carboxyiic acids, ethers, esters, nitrates, nitrites, alkoxy groups, hydroxyl groups, amino groups, halo groups, earbonyi groups, benzyl groups, cyano group, siiyl groups, sulfonic acid groups, phosphoric acid groups, boronic acid groups, free radicals, and any combination thereof. Typical are functional groups that are sufficiently charged to provide electrostatic repulsion for exclusion of ions, as well as of a high dipole movement. In one embodiment of a carbon nanotube functionalization procedure, SWNTs are obtained as starting material and then purified and functionalized with COOH groups by refluxing in sulfuric acid/nitric acid.

Examples

Materials and Methods

Electrode Modified Cross-Flow Cell.

Figure 1:
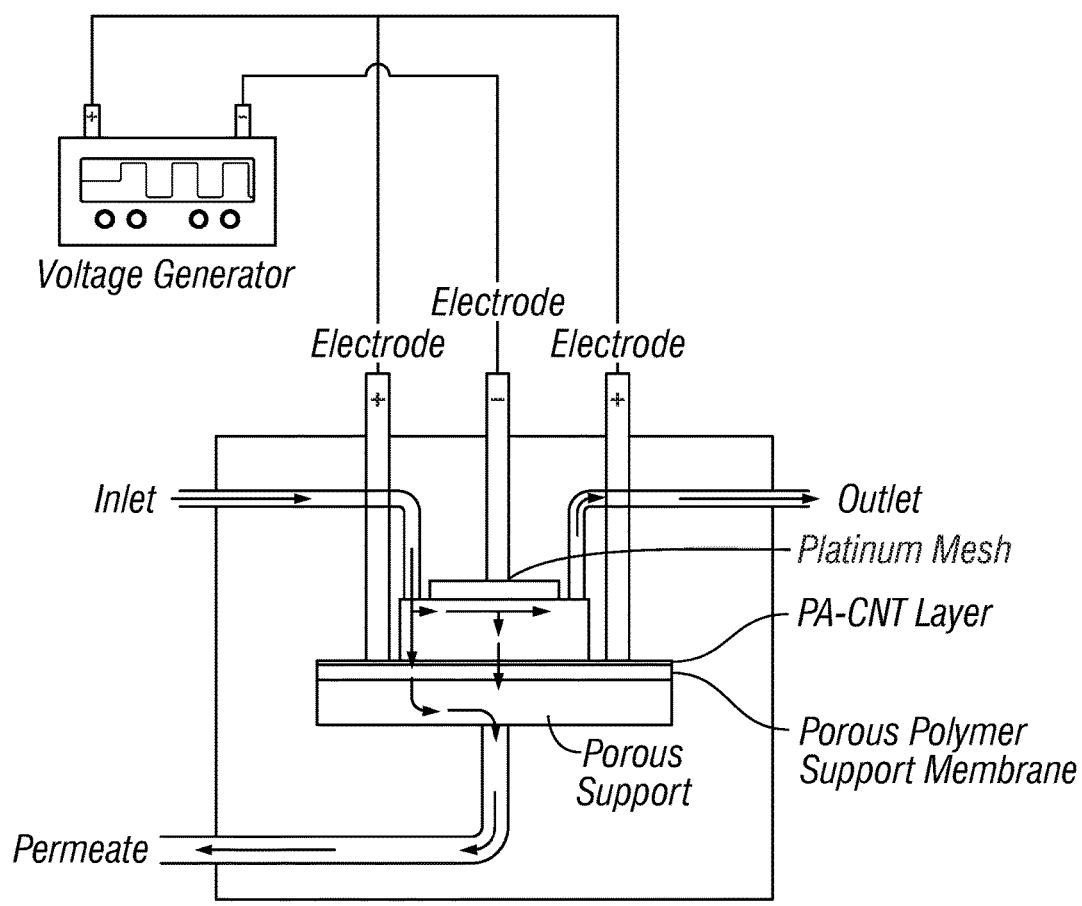
FIG. 1 shows on the left a schematic of the pressurized vessel showing the path of fluid flow. On the right, the figure shows a cross-flow cell with insulated electrodes that connect the membrane to the voltage source.
Figure 1:
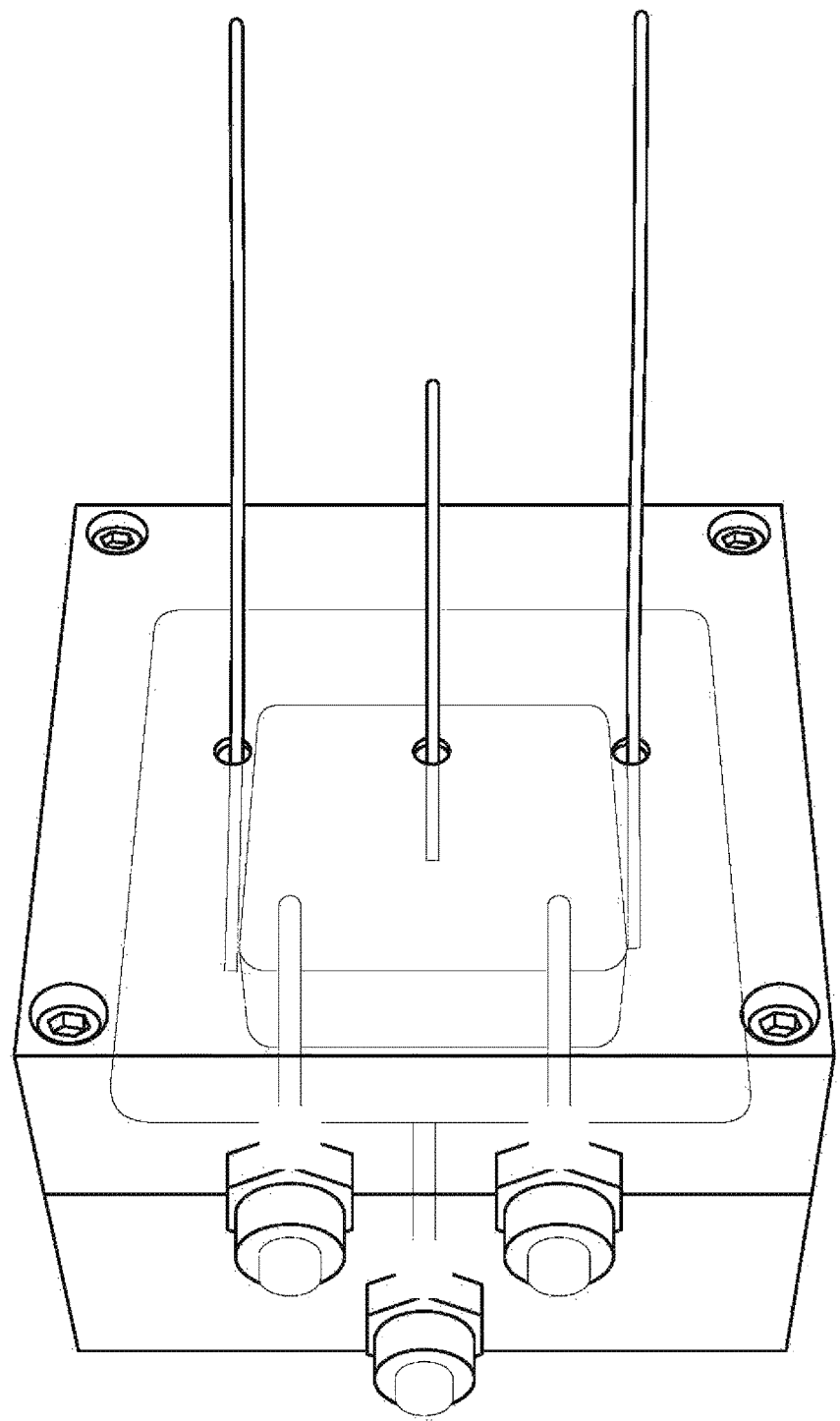

A polycarbonate, custom built, cross-flow filtration unit was used to measure salt rejection and membrane permeability, and was employed for all biofouling experiments including all control experiments. The filtration unit was designed with built-in insulated steel electrodes capable of delivering an electric charge to the membrane thin film surface (effective membrane surface area was 21.6 cm$^2$) and to a counter unreactive platinum electrode located at the top of the channel, 5 mm above the membrane surface, as shown in FIG. 1. During operation, a pressurized feed stream was passed over the membrane. This feed stream was separated into a permeate and a retentate stream. The former was collected to measure flux and rejection, while the latter was recycled to the feed stream.

Membrane Fabrication.

ECPNC membranes were developed, characterized and then tested in bacterially contaminated waters to demonstrate their biofilm prevention capabilities. These ECPNC tight NF membranes were fabricated from carboxylated multiwalled carbon nanotubes (CNTs) reacted with polyamide to form a highly salt-rejecting thin film. CNTs (0.1 mg/mL) (cheaptubes.com, Brattleboro, Vt.; <8 nm diameter; 10-30 μm length, 3.8% carboxylation) were added to deionized water (DIW) together with sodium dodecylbenzene sulfonate (1 mg/mL). This suspension was sonicated with a sonication probe (Branson Ultrasonics, Danbury, Conn.) for 5 min at 70 W, in 3 s pulses interspersed by 3 s. This was followed by 2 min of continuous sonication in a sonication bath to ensure that all the CNTs were well suspended. Once the CNTs were homogenously suspended in solution, 30 mL of the CNT suspension was deposited onto a polyethersulfone (PES) support membrane (0.1 μm; Sterlitech, Kent, Wash., 47 mm diameter coupons, 274±13 mg) and washed several times with DIW to produce a deposited CNT layer with a final content of 3 mg per membrane (274±13 mg). To form the salt rejecting thin-film, established PA thin film membrane forming techniques were used. In short, the CNT covered PES support was immersed in a 2.0% (w/w) aqueous solution of m-phenylenediamine (MPD) for 30 s, slightly dried, and then immediately immersed in a 0.15% (w/w) solution of trimesoyl chloride (TMC) dissolved in hexane for 30 s. The membranes were then air-dried, cured in an oven, and stored in DIW until used. Plain PA membranes were formed in the same manner, without the CNT deposited layer.

Membrane Characterization.

The membrane material was characterized by several methods. For Scanning Electron Microscopy (SEM; FEI XL30 SEM-FEG), bare membranes were dried in a desiccator and then coated with 5 nm of gold particles in a vacuum sputter coater (Denton Desk IV) before being analyzed under SEM. Transmission Electron Microscopy (TEM, FEI Tecnai G2 Twin TEM) was used to analyze thin-film cross-sectional morphology. For TEM studies, membranes were cast in SPURR resin and then microtomed to 60 nm slices (Ultra Microtome, Ultracut). These thin cross sections were mounted on TEM lacey copper grids and analyzed under TEM. Attenuated Total Reflectance—Fourier Transformed Infrared Spectroscopy (ATR-FTIR, Bruker Tensor 27 spectrometer fitted with a Pike TechnologiesSingle Reflection ATR accessory and a DTGS detector) was used to determine bonding behavior. ATR-FTIR Spectra of the membrane were recorded using 64 coadded scans and a mirror velocity of 10 kHz at a resolution of 4 cm$^{-1}$. Four-point conductivity probes (Signatone S-302-4) were utilized to measure electrical sheet resistance. Contact angle instrumentation (Krüss Easy Drop Shape Analysis System DSA25) was used to elucidate surface hydrophilicity.

Membrane Permeability and Salt Rejection.

Salt rejection and membrane permeability experiments were conducted using the novel cross-flow cell. Two electrical conditions were evaluated in all experiments—no charge and a 1.5 V square wave that alternated potential between positive and negative signals applied for a period of 1 min each (±1.5 V at 16.7 mHz). Two NaCl solutions were used to evaluate rejection. The first solution was 1 g/L NaCl in DIW. The second solution used was a 10% Lysogeny broth (LB; 10 g/L tryptone, 5 g/L yeast extract, 10 g/L NaCl). In all cases, the membranes were allowed to compress for 120 min with DIW at 100 psi. Following compression, the salt solutions were introduced to the membrane, also at 100 psi, with a flow rate of 100 mL/min. After 4 h of operation, permeate conductivity was measured to determine salt rejection, and flux measurements were taken every 5 min for an hour.

Membrane Biofouling.

*Pseudomonas aeruginosa* (*P. aeruginosa* strain PAO1 ATCC number 47085), model biofouling bacteria, were grown in lysogeny broth (LB) at 35° C. and populations were measured by plate counts correlated to UV-vis spectra. In each biofouling experiment, feedwater containing 108 CFU/mL of *P. aeruginosa* in 10% LB media was used to challenge the membrane. These bacterial concentrations are significantly larger than those found in traditional wastewater treatment plants and over 3 orders of magnitude greater than those typical found in environmental conditions. Bacteria grew unchecked for the duration of the experiment so that final bacterial populations after several days' growth were consistently higher than 10$^{14}$ CFU/mL. Desalination of the feed was conducted up to 90% recovery over 3-6 days with no feed dilution. This resulted in highly concentrated bacterial feed solutions representing extreme operating conditions.

ECPNC membranes were inserted into the novel cross-flow cell to simultaneously filter and desalinate bacterially contaminated waters to demonstrate the biofilm inhibition capabilities of these membranes when an external electric potential is applied. In addition, three different control experiments were conducted (all performed in triplicate) to desalinate these bacterially contaminated waters. Three control conditions were evaluated: (1) plain PA membranes without an applied potential, (2) ECPNC membranes without an applied potential, and (3) CNT-PA membranes formed with an electrically resistive surface layer with an applied potential. In each experiment and control, membranes were securely positioned in the cross-flow chamber ensuring that the insulated electrodes were in good contact with the membrane. In each biofouling experiment, membranes were exposed to a cross-flow of the previously described extreme conditions—highly bacterially contaminated waters in LB media. The experiments were allowed to continue until the water flux had decreased by 45±3% over the initial flux. At this point, cross-membrane pressure was decreased and the membrane surface was flushed with the bacterially contaminated feed solution for 1 min. Cross-flow flushing, pressure, and cross-flow velocity were restored for an additional 2 h of further desalination or until flux decreased by 45±3% once again. In total, this procedure was repeated three times consecutively for each membrane.

Biofilm Analysis.

Membrane biofouling was quantified as irrecoverable loss-of-permeate flux and further characterized by SEM, fluorescence microscopy of the membrane surface, and PCR detection. Membranes used in biofouling experiments were gently washed in an indirect stream of DIW after the completion of the experiment. For SEM analysis, membranes were immobilized in a 15% gluteraldehyde solution for 24 h and then dehydrated in stages with increasing concentrations of ethanol before they were exposed to SEM. SEM was used to analyze surface morphology, bacterial colony distribution, and presence of EPS. For fluorescence microscopy, membranes were stained with DAPI stains and then imaged under fluorescence microscopy. DAPI stains bacterial DNA indicating the presence or absence of bacteria on the membrane. Biofilm growth on the membrane filter was verified as *P. aeruginosa* through PCR detection. We isolated bacterial DNA through standard methods from swabs of the biofilms. Primers targeting the GDP mannose dehydrogenase (algD) gene in *P. aeruginosa* were used. Reactions conditions in a thermocycler run of 5 min at 94° followed by 30 cycles of 94° C. for 60 s, 60° C. for 60 s, and 72° C. for 60 s, with a final extension of 72° C. for seven minutes were used.

ECPNC Membrane Material Properties.

The electrically conducting polymer nanocomposite membranes developed and used in this study are noteworthy polymer membranes due to their highly electrically conductive surface. Electrical conductivity is endowed through the use of carbon nanotubes, which were covalently bonded to polyamide monomers. This modification of the traditional polyamide membrane provides high electrical conductivity to the thin film without sacrificing either the rejection or the permeation properties of the membrane.

Thin Film Surface Morphology.

The electrically conductive thin film PA-CNT membrane is shown in FIG. 2. The black surface is due to the presence of the CNTs in the PA matrix. The white rim around the black ECPNC membrane is the 0.1 μm PES support membrane. SEM images of the membrane show a thin layer of PA-CNT composite formed on the PES support (part b of FIG. 2). The PA-CNT thin film appears morphologically similar, but not identical, to other PA thin films reported in the literature. The combination of MPD, TMC and CNTs forms a covalently bonded thin-film (demonstrated in FTIR measurements) atop the PES support, in which the CNTs are an integral part of the active membrane layer.

Contact angle measurements of the membrane material gave a value of 77°±3°. This value is slightly higher than contact angles typically observed on PA membranes (~60° to) 70° and is likely the result of the addition of hydrophobic CNTs to the polymer matrix.

Thin Film Surface Electrical Conductivity.

A TEM image of the cross-section of the microtomed resin-encapsulated ECPNC membranes is shown in FIG. 3. Three distinct layers are evident—the PES support, a CNT layer, and a thin filamentous PA-CNT layer (part a of FIG. 3). The PA-CNT layer is the active rejection layer that comes in contact with the salt solution. A few CNTs were visible within the PA matrix and, although they were difficult to pinpoint. From the TEM images, the CNT layer was measured to be approximately 400 nm thick. The filamentous upper layer was measured to be approximately 100 nm thick.

The measured sheet resistance of the ECPNC thin film surface was 6436±336 $\Omega$/sq. This is slightly higher than the sheet resistance of pure buckypaper, (200-1000 $\Omega$/sq depending on film thickness) probably due to the insulating properties of the PA matrix. However, for water treatment purposes, the electrical conductivity of the PA-CNT composite tight NF membrane is more than sufficient; assuming a CNT thickness of 400 nm as measured from the TEM images (FIG. 3), the membrane has an electrical conductivity of ~400 S/m, which is nearly 2 orders of magnitude greater than seawater (4.8 S/m). Cyclic voltammetry was performed on the surface of the ECPNC membrane, in 1 M NaCl with an Ag/AgCl reference electrode with 4 M KCl. Current to Voltage is linear from −0.9 to 0.9 V (part b of FIG. 3).

ECPNC Chemical Bonding.

The CNTs used in this study were sold as carboxylated CNTs, with a carboxyl group content of 3.86%. To carboxylate the CNTs, the manufacturer refluxed the material with acid. It is known that refluxing CNTs in strong acids adds both carboxyl and hydroxyl side groups. The acyl chloride group on the TMC molecule can react with the hydroxyl side group on the surface of the CNT to form an ester bond (FIG. 8). The acyl chloride can also react with the carboxyl groups on the CNTs, but the resulting anhydride is not stable in water, and the bond is quickly hydrolyzed.

The addition of carboxylated/hydroxylated CNTs to the PA matrix is evident by the appearance of the FTIR peak at 1725 cm$^{-1}$ (FIG. 4) that is associated with the C=O stretching mode of the ester bond formed from the condensation reaction between the acyl chloride group on the TMC and the hydroxyl group on the CNT. Other peaks typically associated with PA, such as the C=O stretching of the amide bond (1643 cm$^{-1}$), C=C ring stretching of the aromatic amide (1610 cm$^{-1}$), and N—H in-plane bending and N—C stretching vibration of the —CO—NH— group in the amide (1543 cm$^{-1}$), are also evident (FIG. 4).

Salt Rejection with and without Applied Potential.

NaCl rejection, measured as changes in conductivity, exceeded 90% in all cases (Table 1). This level of salt rejection indicates that the membranes are suitable for desalination applications, although improvements to the rejection capabilities are desirable. Pure water permeability was assessed in the presence and absence of an applied voltage (1.5 V bloc current). Water permeability was measured at $8.8\pm1.0\times10^{-12}$ m/Pa·s and $9.2\pm1.3\times10^{-12}$ m/Pa·s ($3.2\pm0.4$ L/m²·h·bar and $3.3\pm0.5$ L/m²·h·bar) with and without an applied voltage, respectively. This similarity implies that applying an electrical potential to the membrane does not change its transport properties. In house prepared plain PA membranes had water permeability of $1.3\pm0.2\times10^{-12}$ m/Pa·s ($0.48\pm0.06$ L/m²·h·bar) and NaCl rejection of 91.3%. Commercially available tight NF membranes achieve water permeability typically in the range of $1.58\pm0.11\times10^{-11}$ m/Pa·s and $3.19\pm0.08\times10^{-11}$ m/Pa·s ($5.7\pm0.4$ L/m²·h·bar and $11.5\pm0.3$ L/m²·h·bar, respectively) and respectively their NaCl rejecting abilities at relatively low concentrations of 0.1 g/L vary greatly from 66% to 99%. The membrane material described in this disclosure achieves a rejection value near the top of this range, with a permeability that is slightly lower. Commercial NF membranes often undergo several post fabrication processing steps, such as chlorine treatment, that increase their permeability. The membranes described here did not undergo any such treatments, and therefore, it is reasonable to expect that their permeability could be increased significantly. Further, commercial RO membranes have similar permeability to those of our ECPNC membranes, with higher salt rejection. With greater optimization of the CNT-PA layer, it is reasonable to expect higher salt rejections in the future making ECPNC membranes more comparable to commercial RO membranes.

TABLE 1

Salt Rejection Characteristics of Electrically Conducting Tight NF Membrane

| solution | potential (V) | salt rejection |
|---|---|---|
| DIW + NaCl (1 g/L) | 1.5 | 92.1 ± 1.3% |
| DIW + NaCl (1 g/L) | 0 | 91.3 ± 0.9% |
| LB (1 g/L NaCl) | 1.5 | 93.4 ± 2.1% |
| LB (1 g/L NaCl) | 0 | 95.2 ± 1.6% |

Biofilm Development and Biofouling Prevention.

The disclosure demonstrates the ability of ECPNC membranes to prevent biofilm development, and thus biofouling, during filtration and desalination of bacterially contaminated saline waters. Despite the extreme conditions to which these membranes were subjected, biofouling prevention was consistently and repeatedly confirmed. Robust controls done in triplicate were performed to verify these findings.

Biofouling Control Experiments.

As shown in FIG. 5, all control experiment fluxes decreased over time. In all effective in preventing biofilm formation when exposed over time to highly concentrated suspensions of bacteria (hashed line in FIG. 5). Control 3 eliminated the possibility of either Joule heating or electrical discharge from the electrodes as a factor in preventing surface biofilm formation (dotted line in FIG. 5).

Biofouling Prevention with Electrically Charged ECPNC.

In the case of ECPNC membranes connected to the voltage generator (1.5 V square wave, 16.7 mHz), the flux reduction and recovery behavior were significantly different. A comparison of the controls with the ECPNC membranes is shown in FIG. 5. Whereas flux loss did occur for the electrically charged ECPNC membranes, the rate of flux decline was up to three times lower than in the control experiments, with a 45% flux decline observed only after 80 h, compared to 22 and 30 h in experiments for control types 2 and 3, respectively. Further, after performing the pressure reduction and 1 min of cross-flow flushing (with no cleaning agents), followed by continued desalination at high pressures, water flux was consistently and reproducibly recovered from 92% up to 100% of the initial flux. Flux recovery of such magnitude was reproducible throughout continued desalination of the feed and over triplicate experiments (FIG. 5). In FIG. 5, these flushing procedures and their resultant flux recoveries can be clearly seen to occur after 80 h and again after 118 h (circles).

Salt rejection was monitored in all experiments (Table 2). Salt rejection was identical immediately before and after crossflow flushing, demonstrating that flux recovery in the ECPNC membranes with applied voltage was not attributed to structural damage. The variations within the salt rejection data are statistically insignificant both throughout each experiment and between experiments and controls.

TABLE 2

Salt Rejection of ECPNC Membranes Before and After Cross-Flow Flushing

| salt rejection | control w/o V | experiment w/V |
|---|---|---|
| initial | 93.2 ± 1.6% | 96.7 ± 4.0% |
| before flushing | 89.4 ± 2.6% | 95.6 ± 6.1% |
| after flushing | 90.0 ± 2.0% | 94.6 ± 4.6% |

Membrane autopsies were performed post experiment and then prepared for imaging under high resolution SEM. Images of the membrane surface show that control membranes were fouled with dense biofilms, whereas ECPNC membranes with applied voltage show clean and compressed surfaces lacking any evidence of bacterial attachment or EPS (FIG. 6). As additional support for this claim, DAPI staining of the membranes was performed. Control membranes showed bright, homogeneous staining throughout the membrane indicating large amounts of bacterial DNA located on the membrane surface. In comparison, ECPNC membranes with applied voltage showed insignificant amounts of bacterial DNA suggesting a significant dearth of attached bacteria and an absence of biofilms.

Biofilm Growth Prevention Mechanism and Discussion.

The results of these long-term experiments are explained in terms of biofilm development versus deposited organic matter. If the reduction in flux could be attributed solely to pressure deposited organic matter including bacteria, unpressurized cross-flow flushing would remove the deposited organic matter, returning flux to its initial value (within some error, due to incomplete removal). However, if a biofilm formed, cross-flow flushing would not remove the EPS-bound biofilm. It has been shown in the literature that biofilms formed from the deposition of EPS are exceedingly difficult to remove. Neither back flushing of membranes, nor increased cross-flow velocities are effective in the removal of established biofilms. In the case that flux could not be recovered by increased cross-flow velocity, the loss of flux is wholly attributed to biofouling and EPS deposition, rather than to deposited organic matter. The control experiments demonstrate traditional biofilm formation, as evidenced by irrecoverable water flux, SEM images of biofilms, and DAPI staining of bacterial DNA. In stark contrast is the highly recoverable flux behavior of the electrically charged ECPNC membranes connected to a voltage source as well as the biofilm-free surfaces in the SEM and fluorescence images.

The flux reduction in this case is solely due to deposition of organic matter from the applied pressures, rather than from biofilm formation.

The mechanism for the prevention of biofilm formation through applied alternating electrical potential is currently not fully understood, but it is hypothesized to occur for a number of reasons. For example, an alternating electrical potential causes instabilities in the local pH and to the electrical double layer (EDL). These nonequilibrium conditions at the membrane surface create nonideal environments for bacteria, obstructing the production of EPS. Further, during times of negative applied potential, it has been shown that bacteria are repelled by like-charge electrostatic interactions.

Under positive applied potential, bacteria discharge the surface of the ECPNC membrane, causing oxidizing conditions, which have been shown to lead to cell lysis and cell death. Finally, given the cyclic voltammetry measurements (linearity between ±0.9 V) and the applied potential (1.5 V), hydrolysis may occur at the ECPNC surface. However, the overpotential for hydrolysis is only attained very near to the electrode contact point. As a result, hydrolysis that occurs within the flow cell would only have minimal effect on the overall biofouling resistance of the membrane. The composite effects occurring with environmentally relevant bacterial populations under realistic high-pressure conditions have not been explored.

Despite unanswered mechanistic questions, the development of a novel electrically conductive, salt rejecting, high-flux thin film composite provides exciting possibilities for efficient nanofiltration and reverse osmosis operations. The conductive properties of the membrane material create an electrically conductive surface that can be utilized in multiple applications and has been shown here to completely prevent biofouling.

Incorporating CNTs into the membrane matrix to allow electrical conductivity does not significantly sacrifice two of the most important properties crucial for NF processes, namely salt rejection and water permeability. On the basis of current CNT costs, imparting electrical conductivity to NF membranes would add ~$2.5/m$^2$ in material costs representing only a 1.5% increase in the total price of traditional tight NF membrane modules. By preventing biofilm formation and thus providing continued water flux recovery, ECPNC membranes offer a potential means to greatly reduce expensive and environmentally costly RO pretreatments. With these improvements in current practices, RO can become an efficient alternative to other water treatment technologies, and can provide a cost-effective and environmentally benign way to fill the growing water needs of the world.

A number of embodiments of the invention have been described. Nevertheless, it will be understood that various modifications may be made without departing from the spirit and scope of the invention. Accordingly, other embodiments are within the scope of the following claims.

What is claimed is:

1. An electrically conductive composite membrane comprising a polymer support, a functionalized carbon nanotube (CNT) layer on the polymer support, and a polyamide-CNT layer on the CNT layer, wherein the polyamide-CNT layer comprises CNTs incorporated within a polyamide matrix, and wherein the electrically conductive composite membrane has electric conductivity of about 400 S/m.

2. The electrically conductive membrane of claim 1, wherein the CNTs form ester bonds with trimesoyl choloride.

3. The electrically conductive composite membrane of claim 1 formed by:
   pressure depositing a solution of functionalized carbon nanotubes onto a polymer membrane support to form a CNT-membrane composite; and
   drying the composite.

4. The electrically conductive composite membrane of claim 3, wherein the functionalized carbon nanotubes are prepared by placing functionalized carbon nanotubes (CNTs) in powder form in deionized water at a concentration of about 0.05 to about 0.15 mg/ml together with a surfactant and sonicating suspension to form a solution.

5. The electrically conductive composite membrane of claim 4, wherein the surfactant is sodium dodecylbenzenesulfonate.

6. The electrically conductive composite membrane of claim 4, wherein the solution is centrifuged to remove clumps and debris.

7. The electrically conductive composite membrane of claim 3, wherein the pressure depositing is performed at a pressure of about 50 psi or greater on a membrane support.

8. The electrically conductive composite of claim 1 or 3, wherein the functionalized carbon nanotubes are functionalized with COOH, OH, and/or NH$_2$ functional groups.

9. The electrically conductive composite of claim 1 or 3, wherein the carbon nanotubes are single-walled, multi-walled, or double-walled carbon nanotubes.

10. The electrically conductive composite of claim 1 or 3, wherein the membrane support comprises a polyethersulfone or polysulfone.

* * * * *